(12) United States Patent
Vyrodov

(10) Patent No.: US 9,115,411 B2
(45) Date of Patent: Aug. 25, 2015

(54) METHOD FOR PRODUCTION OF BIO-STIMULANT, FERTILIZER, SOIL CONDITIONER AND WIND SOIL EROSION SUPPRESSANT FROM THE VEGETATIVE POLYSACCHARIDES AND THEIR COMPOUNDS

(75) Inventor: Victor Vyrodov, Melbourne (AU)

(73) Assignee: Victor Vyrodov (AU)

( * ) Notice: Subject to any disclaimer, the term of this patent is extended or adjusted under 35 U.S.C. 154(b) by 0 days.

(21) Appl. No.: 13/447,222

(22) Filed: Apr. 15, 2012

(65) Prior Publication Data
US 2012/0260706 A1    Oct. 18, 2012

(30) Foreign Application Priority Data
Mar. 24, 2011 (AU) ................ 2011201345

(51) Int. Cl.
| | | |
|---|---|---|
| *C05F 5/00* | (2006.01) | |
| *C05F 11/00* | (2006.01) | |
| *C13K 13/00* | (2006.01) | |
| *C13K 1/02* | (2006.01) | |

(52) U.S. Cl.
CPC . *C13K 1/02* (2013.01); *C05F 5/002* (2013.01); *C05F 11/00* (2013.01); *C13K 13/00* (2013.01)

(58) Field of Classification Search
CPC .......... C05F 5/002; C05F 11/00; C13K 13/00
USPC .................... 127/29, 36, 37; 71/23
See application file for complete search history.

(56) References Cited

U.S. PATENT DOCUMENTS

| | | | | |
|---|---|---|---|---|
| 1,105,607 | A * | 8/1914 | Benjamin | .......................... 71/23 |
| 5,023,097 | A * | 6/1991 | Tyson | ............................ 426/271 |
| 8,003,352 | B2 * | 8/2011 | Foody et al. | ..................... 435/72 |
| 8,685,685 | B2 * | 4/2014 | Retsina et al. | ................ 435/165 |

* cited by examiner

*Primary Examiner* — David M Brunsman

(57) ABSTRACT

A method of treating vegetative saccharides provides hydrolysates suitable for use as bio-stimulants, fertilizers, soil conditioners and wind soil erosion suppressants. The method comprises the steps of treating the vegetative saccharides, in series, in acid and alkali environments at temperature higher than ambient.

The produced product contains humins, levulinic, humic, saccharinic and aldonic acid salts which are effective bio-stumulants and fertilizers for plant growth. Their hydroscopic properties provide (as soil conditioner) the increased water sorption of soil. The saccharinic acid salts binding properties provide forming soil particles together protecting soil against wind erosion.

9 Claims, No Drawings

METHOD FOR PRODUCTION OF BIO-STIMULANT, FERTILIZER, SOIL CONDITIONER AND WIND SOIL EROSION SUPPRESSANT FROM THE VEGETATIVE POLYSACCHARIDES AND THEIR COMPOUNDS

BACKGROUND

The saccharides (or carbohydrates) are divided into four chemical groupings: polysaccharides, oligosaccharides, disaccharides, and monosaccharides. Polysaccharides, oligosaccharides and disaccharides are high-molecular carbohydrate structures, formed of monosaccharide units joined together by glycosidic bonds.

The vegetative saccharides of the present invention may be the extracts from the plants, for instance, cellulose from sulphite wood chips cook, sucrose from sugar beet juice and others. Also the vegetative saccharides may be as parts of the plants (cellulose of wood, straw and other vegetative substances)—these vegetative saccharides are treated without the previous extraction, for example, the wood chips, containing cellulose, are treated without the cellulose previous extraction.

The vegetative saccharides are traditionally used as the main ingredients for the compost, producing quite effective fertilizers for the soil. The main disadvantage in this method is the length of time of the compost production: from several months to two years.

It is known a method of using molasses as a fertilizer. The sucrose, fructose and glucose are a significant part of molasses which feeds soil microorganisms and promote soil improvement. The disadvantage in that method is: that the molasses is not a bio-stimulant and fertilizer of rapid action. The sucrose, fructose and glucose of the molasses, for assimilation by plants, must be first converted to the organic acids by soil microorganisms.

The closest to the presented invention is the patented method of a biomass treatment with hydrogen peroxide and alkali agent, acting the delignification and producing the substrate which can be used as a dietary and absorbent fiber (U.S. Pat. No. 5,023,097). But this substrate cannot be used as a bio-stimulant, fertilizer, soil conditioner and wind soil erosion suppressant. The substrate as a compound containing the vegetative saccharides can be processed into a bio-stimulant, fertilizer, soil conditioner and wind soil erosion suppressant according to the presented invention method.

SUMMARY

The general idea of the suggested method is the conversion of the vegetative saccharides to the effective bio-stimulant, fertilizer, soil conditioner and wind soil erosion suppressant. The suggested method comprises the steps of treating the vegetative saccharides and/or compounds containing them (such as saw dust, sugar cane juice and others), in a series, in acid and alkali environments at temperature higher than ambient, providing the production of mainly carbonic acid salts and other substances which are beneficial for soil.

DETAILED DESCRIPTION

The present invention relates to the hydrolytic treatment of the vegetative saccharides in an acid environment at temperature higher than ambient. The second stage of the vegetative saccharides treatment takes place in an alkali environment at temperature higher than ambient.

The acid and alkali hydrolysis (conversion) of vegetative saccharides is realized at temperature 40-250° C. at ambient, positive and negative pressure. The pH of the acid environment is about 0.1 or greater. The pH of the alkali environment is up to about 14.0. The efficiency of the acid and alkali processes can be increased by using a catalyst. The solids content of the vegetative saccharides varies from about 0.5% to about 95.0%. The time of the acid and alkali treatment can be from about 1 min to about 48 hours.

In the process of acid cook of the vegetative saccharides: polysaccharides, oligosaccharides and disaccharides are invented to monodisaccharides: hexoses and pentoses. A part of the hexoses and pentoses is converted to humins, levulinic, and aldonic acids. Levulinic acid and humans are known as the effective bio-stimulants plant growing.

In the process of the further alkali cook, the rest of monosaccharides (hexoses and pentoses) are converted to saccharinic acids and their salts. Levulinic and aldonic acids are neutralized to their salts. The humins are partially oxidised and converted to humic acids and their salts, which are more active as bio-stimulants than humins.

The final product contains the recognized bio-stimilants for plant growing-like levulinic and humic acid salts and humins. They maintain soil stability and enhance the soil water-holding capacity, they also function as a cation exchange system, and improve soil content while generally improving soil fertility. Also the cooked product contains other carbonic acid salts: saccharinic and aldonioc acid salts, which feed (as fertilizer) and can stimulate (as bio-stimulant) plant root development. The hydroscopic properties of the carbonic acid salts of the new product (as soil conditioner) provide the increased water sorption and water retention of soil. The salts of carbonic acids also energize the biological life of the soil and stimulate the production of beneficial bacteria. The salts of saccharinic acids have the binding properties. By spraying the new product solution on top of soil, a soil layer is formed by binding soil particles together protecting soil against wind erosion.

The invention claimed is:

1. A method of treating vegetative saccharides to produce hydrolysates suitable for use as bio-stimulants, fertilizers, soil conditioners and wind soil erosion suppressants comprising:
   a) mixing the vegetative saccharides to an acid environment at a temperature greater than ambient,
   b) mixing the product of step a) to an alkali environment at a temperature greater than ambient,
   c) during step a) and/or b) exposing the material while mixing to air and/or steam to remove furfural, furans and formic acid.

2. The method of claim 1 wherein step a) is carried out at an acid pH of about 0.1 or greater.

3. The method of claim 1 wherein step b) is carried out at an alkaline pH of up to about 14.0.

4. The method of claim 1 wherein the temperature at which step a) is carried at about 40 to 250° C.

5. The method of claim 1 wherein the temperature at which step b) is carried at about 40 to 250° C.

6. The method of claim 1 wherein the vegetative saccharides comprise about 0.5% to about 95% of the mass of the mixture of step a) or of step b).

7. The method of claim 1 wherein step a) is performed for about 1 minute to about 48 hours.

8. The method of claim 1 wherein step b) is performed for about 1 minute to about 48 hours.

9. The hydrolyzed product of claim 1.

* * * * *